Sept. 4, 1951     F. C. GREEN     2,566,766
VALVE FOR AIR BAGS
Filed March 30, 1948

Inventor
*Freddie C. Green*

By *Mason, Fenwick & Lawrence*
ATTORNEYS

Patented Sept. 4, 1951

2,566,766

UNITED STATES PATENT OFFICE 2,566,766

VALVE FOR AIR BAGS

Freddie C. Green, Altoona, Ala.

Application March 30, 1948, Serial No. 17,932

2 Claims. (Cl. 18—45)

This invention relates to a valve stem for use with pneumatic tubes of substantial thickness; more particularly, it relates to a valve stem for use in an air bag of the type commonly used in curing tires.

Air bag valve stems of common types have the tendency of becoming loosened after a relatively short period of time because of the excessive heat developed during the tire curing process, which tends to break the bond between the stem and surrounding rubber, allowing leakage of air.

An object of the present invention, therefore, is to provide a valve stem for use in an air bag, which will overcome the above mentioned disadvantages and which is of such construction that it will minimize development of high temperatures or breakage of its bond to the bag, therefore will have relatively long life.

A still further object of the invention is to provide a novel valve stem having anchoring means which will securely hold the stem in fixed relationship with the tube in which it is embedded despite the application of excessive tilting movements to the outer end of the stem.

Figure 1:
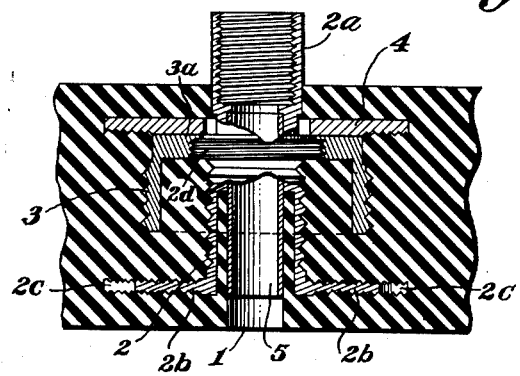
Figure 2:
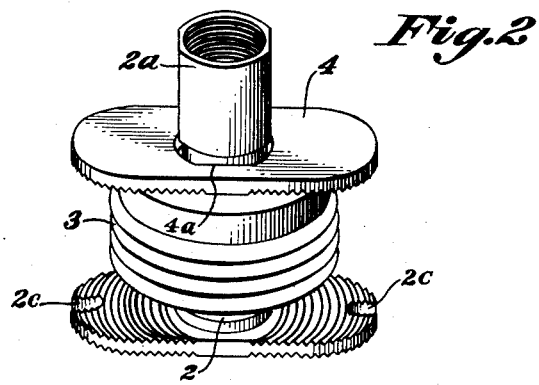

Other objects and advantages of the present invention will become apparent from a study of the following specification taken in conjunction with the accompanying drawings wherein:

Figure 1 is a longitudinal cross-sectional view through a valve stem embodying the principles of the present invention, which stem is shown embedded in the air bag illustrated in fragmentary form; and, Figure 2 is a perspective view of the valve stem shown in Figure 1.

Referring more particularly to the figures, numeral 1 denotes, in fragmentary form, a portion of the cross-section of an air bag or tube of any well known type, made of rubber or other suitable material, which bag is used for curing tires and is of substantial thickness.

Embedded in the air bag across the thickness thereof is a valve stem 2 embodying the present invention, having a top portion 2a projecting exteriorly of the air bag. Stem 2 has bottom outstanding flange portions 2b which are preferably grooved or serrated and provided with slots 2c to allow the stem to become more firmly anchored in the rubber constituting the air bag. Centrally of the valve stem there is provided an integral threaded portion 2d onto which is adapted to be screwed a skirt 3. The skirt has a shoulder portion 3a which is adapted to rest tightly against the top peripheral portion of the threaded portion 2d so as to form a hermetically sealed joint. The skirt 3 is preferably formed with circumferential ridges to provide greater bonding with the rubber forming the air bag.

The top portion 2a of the stem has flattened diametrically opposite portions, as shown more clearly in Figure 2, to enable sliding of a washer 4 thereon also having flattened sides 4a in its opening which barely clear the flattened sides of stem portion 2a as it is slipped on. After the washer is slipped into place so as to surround a grooved lower portion of stem 2a, it is turned 90° about its axis to the position shown in Figure 2 so that its flattened sides will abut against the bottom shoulder portion of stem portion 2a preventing withdrawal of the washer even though lifted. A thin tube 5 is press-fitted to stem 2, there being a space between the stem and tube throughout most of their length.

In assembling the structure, the stem is inserted in place and initially provided with an adapter tube which is fitted in exactly the same position as tube 5 except that it is longer so as to extend throughout the entire thickness of the rubber air bag. A strip of rubber is then wrapped around this tube so as to fill the space between it and valve 2. Similarly, another strip of rubber is wrapped around the space between valve 2 and skirt 3. These strips are provided to insure that no air pockets will be formed. Washer 4 is then slid downwardly along valve portion 2a and turned 90° about its axis so as to lock it to the stem. The stem is then placed in a mold and is embedded in rubber as shown in Figure 1 to form the air bag. During the forming or curing process, the above described strips of rubber become molten or softened and merge with the rubber forming the air bag.

After the bag is formed, the adapter tube is removed and tube 5, of shorter length, is substituted therefor and press-fitted to the interior surface of the stem. If desired, however, the adapter tube may be retained permanently despite its greater length.

In order to form a better bond between the valve stem assembly and the rubber in which it is embedded, I prefer to form the stem assembly of brass of the type that does not contain lead, or of other suitable material.

The valve structure embodying my invention provides a very long path for any air which may tend to escape due to loosening of the rubber from a lower portion of the stem. Such path extends upwardly along the outer surface of stem 2 and is prevented from going through the joint between screw threaded portion 2d and skirt 3 because of the tight fit and because this joint is deeply embedded in the rubber. The air then must travel downwardly, first along the inner surface and then upwardly along the outer surface of skirt 3 in order to escape along the outer portion of the upper stem portion 2a.

The tendency of overheating of stem 2 is minimized because of the presence of thin tube 5 and its surrounding rubber portion which forms a heat insulating layer which minimizes the transfer of heat to the stem 2, keeping the stem temperature relatively low. The skirt 3 and washer 4, as well as stem portions 2b, serve as radiating fins to further dissipate the heat of the stem parts to prevent breaking of the bond between the rubber and these parts which otherwise occurs upon the attainment of relatively high temperatures. The above mentioned parts which serve as fins also serve as anchoring members to prevent rupturing of the rubber bond as a consequence of applying excessive manual tilting forces to upper stem portion 2a.

Thus, it will be seen that I have provided a relatively simple, inexpensive, and reliable valve stem for air bags and similar structures, which stem has relatively long life and is of such construction as to minimize the tendency for the rubber bond therewith to be broken and air to escape—also, which minimizes the tendency of rupturing the bond between the stem and rubber as a consequence of vigorous tilting movements of the stem.

While I have illustrated and described one embodiment of my invention, it will be understood that this is by way of illustration only, and that various changes and modifications may be made within the contemplation of my invention and within the scope of the following claims.

I claim:

1. In an air bag having a body of rubberized material, a tubular valve stem having lower outstanding flange portions extending radially thereof and embedded in the body of said air bag, a central threaded portion, an annular skirt embedded in said air bag body having a shoulder with a threaded aperture therein coupled to said central threaded portion of said stem in airtight sealing relation therewith and having a tubular rim depending from said shoulder and disposed in spaced surrounding relation with a portion of said stem, the intervening space between said tubular rim and said stem being filled with rubber under compression forming a homogeneous mass with the air bag body, said stem having an annular groove therein adjacent the upper end of said threaded portion and inwardly struck diametrically opposite flat sides extending from an end of said stem to said annular groove, and a washer embedded in said air bag body having an opening therein to accommodate said stem and having flattened side portions in said opening corresponding to the flattened sides of said stem, the edges of said washer opening being disposed in locking abutment with a shoulder formed on a side of said annular groove when positioned in registry with said groove and rotated relative to the flattened sides of said stem to restrain said washer against upward movement relative to said stem.

2. In an air bag having a body of rubber material, a tubular valve stem having outwardly extending flanges radiating from said stem at the lower end thereof and embedded in the body of said air bag, an annular skirt embedded in said air bag body and removably coupled to said stem, said skirt having a drum-simulating tubular rim depending from an annular shoulder, said tubular rim being disposed in spaced surrounding relation with said stem, the intervening space between said tubular rim and said stem being filled with rubber under compression forming a homogeneous mass with the rubber material of said air bag, said stem having an annular groove adjacent the upper end of said annular shoulder and opposite flat sides extending from one end of said stem to said annular groove, and a washer element removably coupled to said stem, said washer having an opening therein to accommodate said stem, said opening having flattened portions spaced a less distance apart than the diameter of said stem, the edges of said opening being disposed in locking abutment with a shoulder of said annular groove on rotation of said washer relative to the flattened sides of said stem with said washer in registry with said groove to restrain said washer against upward movement relative to said stem.

FREDDIE C. GREEN.

REFERENCES CITED

The following references are of record in the file of this patent:

UNITED STATES PATENTS

| Number | Name | Date |
|---|---|---|
| 1,570,157 | Knepper | Jan. 19, 1926 |
| 1,818,536 | Crossan et al. | Aug. 11, 1931 |
| 1,927,803 | Mullin | Sept. 19, 1933 |
| 2,218,639 | Crowley | Oct. 22, 1940 |
| 2,308,952 | Ickes | Jan. 19, 1943 |
| 2,415,063 | Hosking | Jan. 28, 1947 |